US008758696B2

(12) United States Patent
Grange et al.

(10) Patent No.: US 8,758,696 B2
(45) Date of Patent: Jun. 24, 2014

(54) DEVICE FOR ELECTROMAGNETIC RADIATION TREATMENT OF A REACTIVE MEDIUM

(75) Inventors: Andre Grange, Lachassagne (FR); Jean-Marie Jacomino, Rilleux-la Pape (FR); Adrien Grandemenge, Saint-Didier au Mont d'Or (FR)

(73) Assignee: Sairem Societe Pour l'Application Industrielle de la Recherche en Electronique et Micro Ondes (FR)

( * ) Notice: Subject to any disclaimer, the term of this patent is extended or adjusted under 35 U.S.C. 154(b) by 450 days.

(21) Appl. No.: 12/933,051

(22) PCT Filed: Mar. 19, 2009

(86) PCT No.: PCT/FR2009/050458
§ 371 (c)(1),
(2), (4) Date: Nov. 10, 2010

(87) PCT Pub. No.: WO2009/122102
PCT Pub. Date: Oct. 8, 2009

(65) Prior Publication Data
US 2011/0052456 A1    Mar. 3, 2011

(30) Foreign Application Priority Data
Mar. 20, 2008    (FR) ...................................... 08 01540

(51) Int. Cl.
*B01J 19/08*    (2006.01)

(52) U.S. Cl.
USPC ...... 422/186; 422/186.29; 219/690; 219/678; 219/702; 219/761; 204/157.15

(58) Field of Classification Search
CPC ............. B01J 19/126; B01J 2219/1269; B01J 2219/1254; H05B 6/70
USPC ............. 422/186, 186.29; 219/690, 678, 702, 219/761; 204/157.15
See application file for complete search history.

(56) References Cited

U.S. PATENT DOCUMENTS

| 4,673,560 A | 6/1987 | Masse et al. |
| 4,999,469 A | 3/1991 | Dudley et al. |

(Continued)

FOREIGN PATENT DOCUMENTS

| DE | 2822370 | 12/1978 |
| EP | 1839741 | 10/2007 |

(Continued)

OTHER PUBLICATIONS

International Search Report; PCT/FR2009/050458; Sep. 22, 2009.

*Primary Examiner* — Xiuyu Tai
(74) *Attorney, Agent, or Firm* — Cantor Colburn LLP

(57) ABSTRACT

The device for electromagnetic radiation treatment of a reactive medium includes an electromagnetic radiation generator, a reactor containing the reactive medium, and a device for transmitting the electromagnetic radiation generated by the generator to the reactive medium contained in the reactor. The device includes a wave guide for transmitting the electromagnetic radiation from the generator and a coupling means arranged to allow transfer within the reactive medium of the electromagnetic energy transmitted by the wave guide. The wave guide includes a curved segment in a general "U" shape forming a return loop from the wave guide. The device further includes a separation wall that isolates the generator form the reactor, with the reactor being connected to the curved segment. The curved segment extends at least partially from one side of the separation wall to the opposite generator.

15 Claims, 5 Drawing Sheets

(56) References Cited

U.S. PATENT DOCUMENTS

| | | | |
|---|---|---|---|
| 2004/0069776 A1* | 4/2004 | Fagrell et al. | 219/690 |
| 2005/0029253 A1* | 2/2005 | De Chily et al. | 219/690 |
| 2005/0246129 A1* | 11/2005 | Lee et al. | 702/127 |
| 2006/0137613 A1* | 6/2006 | Kasai | 118/723 MW |
| 2007/0131678 A1 | 6/2007 | Drozd et al. | |
| 2008/0023886 A1* | 1/2008 | Adrian et al. | 264/489 |

FOREIGN PATENT DOCUMENTS

| | | |
|---|---|---|
| FR | 801 541 | 8/1936 |
| WO | 0111925 | 2/2001 |

* cited by examiner

DEVICE FOR ELECTROMAGNETIC RADIATION TREATMENT OF A REACTIVE MEDIUM

TECHNICAL FIELD

The invention relates to a device for treating a reactive medium with electromagnetic radiation, comprising a device for transmitting electromagnetic radiation.

More particularly it relates to a treatment device comprising an electromagnetic radiation generator, a reactor containing the reactive medium, and a device for transmitting electromagnetic radiation generated by the generator to the reactive medium contained in said reactor, said device comprising a wave guide intended to transmit the electromagnetic radiation of the generator and coupling means arranged for allowing transfer into the reactive medium of electromagnetic energy transmitted by the wave guide.

BACKGROUND OF THE INVENTION

These treatment devices are notably known as a device for heat treatment of a reactive medium, where by <<heat treatment>> are meant various treatments carried out by heating such as evaporation, drying, roasting, extraction of natural products in suspension in a solvent to radiation, reaction or chemical synthesis with heating by dielectric losses (with view of analyzing or producing chemical compounds), dehydration, baking, discoloration, polymerization, cross-linking, treatments with supercritical fluids, dissociation, removal of volatile compounds, etc., as well as various treatments performed simultaneously with heating, such as mixing or milling.

For such heat treatments, it is notably known how to use electromagnetic radiations of the microwave or high frequency type. Microwave electromagnetic radiation relates to waves, the frequency of which is comprised between about 300 MHz and about 30 GHz, preferentially between 400 MHz and 10 GHz, and preferentially between 915 MHz and 2.45 GHz. High frequency electromagnetic radiation relates to waves, the frequency of which is comprised between about 100 kHz and about 300 MHz, preferentially between 13 MHz and 28 GHz.

Such treatment devices find applications for many types of reactive media, which involve a single reagent or a mixture of reagents in variable proportions, in the solid, liquid or gas state, with or without catalysts, said medium comprising at least one component sensitive to radiation. The reactive medium may be of the solid type (for example of granular or powdery type), of the gas, plasma, liquid type (with a solvent and/or solutes absorbing electromagnetic radiation).

The invention is particularly adapted to a microwave electromagnetic radiation, for reasons related to the geometry of wave guides and to numerous applications contemplated for this type of radiation.

As illustrated in FIG. 1, such a device for treating a reactive medium with electromagnetic radiation comprises:
  a microwave electromagnetic radiation generator 100 like for example and in a non-limiting way a magnetron generator or a semiconductor generator;
  a reactor 200 containing said reactive medium, wherein the reactor may assume the shape of a reservoir or a continuous line for circulating said reactive medium; and
  a device 300 for transmitting the electromagnetic radiation generated by the generator to the reactive medium contained in said reactor 200.

This transmission device comprises:
  means 400 for transmitting electromagnetic radiation positioned at the output of the generator 100 and coupled with said reactor 200 in order to transmit the electromagnetic energy to the reactor, these transmission means being of course adapted to electromagnetic radiation and which may for example consist of a wave guide conventionally used in the field of microwaves;
  coupling means 500 arranged for allowing transfer into the reactive medium of the electromagnetic energy from the wave guide 400.
  adaptation means 800 designed in order to allow optimization of transfer of electromagnetic energy to the reactive medium depending on certain physico-chemical parameters of the reactive medium, or even of their time-dependent changes, such as dielectric characteristics, conductivity or polarity of the compounds such as for example the solvent, the chemical reagents, the catalysts, etc.

When operating, the generator 100 generates electromagnetic radiation at a given frequency, for example 2,450 MHz, the wave guide 400 guides the generated electromagnetic radiation, the coupling means 500, known to one skilled in the art, ensuring the energy transfer in the reactor 200 and therefore to the reactive medium, and finally the adaptation means 800 ensure optimization of the transfer of energy to said reactive medium, notably in terms of transmitted power.

The coupling means generally comprise an application device for applying the energy to the reactive medium, currently called an energy applicator, the selection of which depends on the radiation used (high frequency and microwave radiation), on the dimensional characteristics of the medium to be treated and on its treatment mode.

For high frequency applicators, the following applicators are notably known:
  capacitive applicators formed with two capacitor plates between which the high frequency voltage is applied;
  inductive applicators for treating sufficiently conductive materials, these applicators consist of a solenoid energized with a high frequency current;
  applicators with alternating bars for relatively planar materials consisting of tubular or bar electrodes;
  applicators with alternating rings or loops for thread-like materials forming the electrodes.

The major drawback of these applicators is that they are not very or not adapted for ensuring energy transfer into a liquid mass and homogeneously.

For microwave applicators, the following applicators are notably known:
  applicators with a localized field of the single-mode cavity type;
  applicators with a diffuse field of the multi-mode cavity type;
  applicators with a near field of the radiating antenna guide type.

As regards applicators with a localized field or with a diffuse field, they require a reactor at least partly consisting of a material transparent to the waves, i.e. not absorbing the waves, such as for example polytetrafluoroethylene or quartz, which is positioned inside the cavity of the applicator. The reactor containing the reactive medium is then subject to electromagnetic radiation coming from the outside.

The applicator with a localized field, of the single-mode type, is formed with a single-mode cavity of predetermined size, resonating at the emission frequency according to radiation in the direction of the waveguide. This single-mode cavity allows a relatively homogeneous distribution of the electromagnetic field inside the cavity. Nevertheless, with this type of single-mode applicator, the amount of material to be treated is limited by the dimensions of the cavity and therefore of the waveguide. For an industrial application, it is necessary to provide a complex and costly apparatus comprising several single-mode applicators placed in parallel in order to have sufficient output, as well as a complex circulation system for the reactive medium. Further, the transferable electromagnetic energy is limited by the volume at the interface between the product to be treated and the radiation.

The applicator with a diffuse field, of the multi-mode type, on the other hand provides a non-homogeneous distribution of the electromagnetic field inside the cavity, with the presence of hot points. Such a distribution limits the volume of the samples to be treated in the applicators of the multi-mode type, and furthermore requires setting into motion or stirring of the sample in order to ensure homogeneity of the heating by microwaves.

A common drawback to both of these applicators of the single-mode type or multi-mode type is that they require reactors in a suitable material in order not to absorb the waves. In addition to being particularly complex and costly to produce, these reactors transparent to the waves are limited in size and in shape, thereby limiting the treatment by waves to certain reactions and certain reactive media, and excluding other reactions where the shape and the length of the reactor may have a predominant role. It is also noted that for reactions which have to be conducted under high pressure, independently or not of the heating induced by the electromagnetic radiation, these wave-transparent reactors most often withstand high pressures with difficulty.

The other drawbacks common to both of these applicators, of the single-mode or multi-mode type, result from the difficulty of obtaining a constant electric field in the reactor, and finally from the fact that the geometry of the cavity depends on the radiation frequency so that an applicator with a localized field can only operate at a given single frequency.

As regards the applicators with a near field, they are known from the prior art notably from European patent application No. EP 0 329 338 which discloses a device for treating by microwaves ceramic powders in a high pressure environment where the near field applicator is made as a radiating antenna. This device includes a reactor forming a high pressure resonant cavity, in the interior of which microwave radiation is introduced by a rectilinear antenna which partly extends into the cavity.

Patent application FR 08/01541 filed by the applicant also describes a near field type applicator which at least partly extends into the interior of the reactor, the reactor forming a resonant cavity inside which the electromagnetic radiation is introduced by the applicator. In this document, the applicator comprises at least one lossy transmission line having an interface for transferring electromagnetic energy towards the reactive medium.

Near field type applicators solve part of the drawbacks of the applicators of the single-mode or multi-mode type, notably because they allow the radiation to be directly transmitted towards the interior of a reactor, thereby avoiding the use of a reactor transparent to the waves with all the constraints mentioned above.

The adaptation means 800 comprise in a known way:
  a short-circuit piston 810 comprising a metal plate, in copper or aluminium for example, placed perpendicularly to the axis of the wave guide 400, said short-circuit piston 810 is positioned at the end 490 of the wave guide 400 opposite to the generator 100, and therefore downstream from the reactor 200, in order to impose a boundary condition for a stationary wave to be present in the wave guide 400;
  a variable coupling iris 820, positioned in the wave guide 400 between the generator 100 and the short-circuit piston 810, and more particularly upstream from the reactor 200.

In a known way, the short-circuit piston 810 and the coupling iris 820 are both translationally mobile inside the wave guide 400, in order to obtain a resonant cavity of adjustable length in the wave guide 400, and to thus adapt and optimize transmission of electromagnetic energy to the reactive medium. Further, the short-circuit piston 810 and the coupling iris 820 are positioned relatively to the reactor 200 in order to allow centering of the stationary wave on the reactor 200, i.e. the positioning of an antinode of the stationary wave, corresponding to a maximum amplitude, at the reactor 200.

As illustrated in FIG. 1, the treatment devices of the state of the art consist of elements aligned one after the other, i.e. the wave generator 100, the coupling iris 820, the chemical reactor 200, the coupling means 500 and the short-circuit piston 810 are located in the same alignment, along a linear wave guide 400. In such a configuration, the transmission device 300 is said to be in line, with a linear wave guide 400 and aligned adaptation means 800: the coupling iris 820 and the short-circuit piston 810 are positioned on either side of the means 500 for coupling with said reactor 2.

Such an arrangement in line has certain drawbacks, notably for implanting means for driving the short-circuit piston 810 and the coupling iris 820 along the wave guide 400. Indeed, this arrangement in line imposes the use of two distinct servomotors, a first M1 and a second M2 motor respectively, for driving in translation the short-circuit piston 810 and the coupling iris 820 respectively; both of these motors M1, M2 being synchronized by means of a device (not shown) for controlling the motors M1 and M2. The use of two motors M1, M2 thus increases the cost of such a transmission device because of the two motors M1, M2 and of the control device for synchronizing these motors. Further, these motors increase congestion around the wave guide and may furthermore limit access to the reactor 2 or to the coupling means 500, which is particularly redhibitory with a reactor which operates continuously. These motors may thus cause an annoyance to the operators who are working on the device, notably for operators who wish to access the reactor in order to replace it, introduce products or extract products for the purpose of analyses.

The use of a single motor cannot be contemplated for such line transmission devices. Indeed, this would require the use of translational coupling mechanical means between said single motor and the two mobile members of the adaptation means 800 (short-circuit piston 810 and coupling iris 820), said mechanical translational coupling means for example assuming the shape of connecting rods which would circulate along the wave guide 400 on either side of the reactor 200. Such translational coupling means are of course unacceptable for such a device since they form parts external to the wave guide, circulating along the wave guide, and they may be a nuisance to the operators working along the wave guide, and more particularly on the reactor 200. Further, the short-circuit piston 810 and the coupling iris 820 may be very spaced out, sometimes by several meters, so that the coupling means have to extend over a long distance, which may be detrimental to the coupling accuracy between the short-circuit piston 810 and the coupling iris 820.

Another drawback of these line transmission devices is that in order to meet safety standards notably in effect in chemistry laboratories, provision of a long transmission line is known in order to move the wave generator 100 away from the reactor 200, and to thereby isolate it at a certain distance, with possible interposition of a concrete wall. This separation or moving away of the generator 100 has the purpose of providing protection against any risk of fire or explosion, in particular when the reactor 200 contains solvents or other volatile materials and capable of catching fire or even causing an explosion when they are in contact with a spark generated at the generator 100, and more particularly at the power supply of the generator. For example, it is noted that a magnetron requires a high voltage power supply of the order of 12-15 kV. In order to avoid the occurrence of these electric flash phenomena in wave guides, it is also known how to provide inertization of wave guides by filling them up with a neutral gas such as nitrogen.

Further, it should be noted that such a separation distance is suitable for preventing the generator and its power supply from being subject to chemical aggressions by products contained in the reactor 200, notably during their introduction into the reactor 200.

However, such a separation distance has the consequence that the transmission device with a suitable length is particularly costly and cumbersome since it requires a great length inside the room which receives the latter, or even requires two adjacent rooms. This linear congestion may also cause annoyance for an operator working on this device, since it may be difficult to walk around the device in order to carry out adjustments on its various elements.

The state of the art may also be illustrated by the teaching of documents DE 28 22 370 A1, WO 01/11952 A and US 2007/131678. Document DE 28 22 370 A1 describes a microwave treatment device comprising a wave guide transmitting the microwave radiation of a generator to material droplets which are directly introduced into the wave guide by means of a droplet dispenser, wherein the wave guide includes a curved segment in a general "U" shape. Documents WO 01/11925 A and US 2007/131678 describe treatment devices comprising an electromagnetic radiation transmission device comprising a wave guide transmitting the radiation from a generator to a reactive medium circulating on a conveyance path directly extending inside the wave guide, wherein the wave guide includes a curved segment in a general "U" shape. The devices described in these three documents are of the localized field applicator type, of the single-mode type, wherein the interior of the wave guide forms the single-mode cavity with all the drawbacks mentioned above.

BRIEF SUMMARY

The invention solves all or part of these drawbacks mentioned above and for this provides a device for treating a reactive medium with electromagnetic radiation, comprising an electromagnetic radiation generator, a reactor containing said reactive medium, and a device for transmitting the electromagnetic radiation generated by the generator to the reactive medium contained in said reactor, said device comprising a wave guide intended to transmit the electromagnetic radiation of the generator and coupling means arranged for allowing transfer into the reactive medium of the electromagnetic energy transmitted by the wave guide, remarkable in that the wave guide includes a curved segment, notably in a general "U" shape, forming a return loop from said wave guide, and in that it comprises a separation wall with which the generator may be isolated from the reactor, said reactor being coupled with the curved segment of the wave guide and said curved segment at least partly extending on one side of the separation wall opposite to said generator.

Thus, the wave guide has a more compact conformation and no longer a purely linear conformation. With this conformation it is therefore possible to provide a more compact heat treatment device requiring less space in a room, and the handling of which is easier.

With such a conformation, as described below, it is also possible to implant mobile adaptation members of the variable coupling iris and short-circuit piston type on each branch of said return loop, thereby allowing them to be spatially positioned facing each other without physical interposition of the reactor.

Such a conformation is further particularly suitable for isolating the generator from the reactor without however requiring large spacing between both of these elements, and thereby meeting the safety standards against the risks of fire and explosion.

Such a device is therefore particularly compact and it is thus conceivable to align several devices in a same room.

In a chemistry laboratory, for example for chemical analyses, the users of the treatment device may handle volatile products capable of catching fire or even of exploding. Such a separation wall is adapted for avoiding this risk by isolating the reactor from electric devices such as the generator and its power supply, without however the complete device occupying a large space.

Thus, with the invention it is possible for a user to handle the reactor, notably for replacing it and introducing or sampling chemical products while being efficiently protected against any risk of fire and/or explosion.

Further, such a user is not concerned with the electric portion of the device, i.e. the generator and its electric power supply, and above all wishes to easily access the reactor. With a conventional in-line configuration, the user sometimes has to pass close to the electromagnetic energy transmission device, with the risk of colliding with this device and its components. With the invention, it is therefore possible to solve this problem of facilitating access to the reactor, without any risk of perturbing the electric portion, with a marked separation between the electric portion and the reactor.

It is a matter of fact that the reactor is coupled with the curved segment of the wave guide via coupling means. Thus, the wave guide, after having crossed once the separation wall so that it may be coupled with the reactor, may again pass onto the other side of the wall, because of its return loop configuration, and therefore exhibit a portion on the same side as the generator thereby occupying a more compact space.

With this configuration it is thus possible to isolate from the reactor both elements located at the beginning of the wave guide, upstream from the reactor and elements located at the end of the wave guide, downstream from the reactor, as this is described below.

According to a feature, the coupling means comprise an application device for applying energy to the reactive medium, and this application device is preferentially a near field type applicator which at least partly extends into the interior of the reactor, said reactor forming a resonant cavity inside which the electromagnetic radiation is introduced by the applicator.

Thus, the whole coupling/application portion is positioned on the side of the separation wall opposite to the generator, allowing easy handling operations on the coupling means, on the application device which notably allows direct immersion into the reactor in order to transmit the electromagnetic radiation to the reactive medium.

In a particular embodiment, the applicator comprises at least one lossy transmission line having an interface for transferring electromagnetic energy towards the reactive medium.

This applicator with a lossy transmission line has many advantages as described in French patent application No. FR 08/01541 to which reference may helpfully be made for more details.

Advantageously, the wave guide includes first and second rectilinear segments facing each other and respectively connected to a first and to a second end of said curved segment.

Thus, the rectilinear segments may be substantially parallel or tilted relatively to each other, the essential point being that they are facing each other, notably in order to be able to interpose between these segments, means for driving mobile adaptation members, as described later on. By this, it is understood that the rectilinear segments each extend along a main direction and are each delimited by at least one so-called rectilinear wall which extends along the corresponding main direction, the rectilinear wall of one of the rectilinear segments is facing the rectilinear wall of the other of the rectilinear segments.

Thus, the wave guide portion downstream from the reactor at which a short-circuit piston is generally movably mounted, is located facing the wave guide portion upstream from the reactor, so that simple and not very bothersome mechanical couplings may be contemplated between these portions, which were up to now impossible in the case of a purely linear configuration, wherein both of these wave guide portions were aligned with physical interposition of the reactor.

Advantageously, the rectilinear segments are parallel, i.e. the main directions of these segments are parallel, notably for facilitating coupling with simple and inexpensive parts.

According to an embodiment, the transmission device comprises adaptation means designed for ensuring adaptation of the electromagnetic radiation to said reactive medium, said adaptation means comprising two mobile adaptation members, conventionally a variable coupling iris and a short-circuit piston, positioned in the wave guide on either side of said curved segment.

Thus, this particular configuration (i.e. with a return loop) of the wave guide allows both mobile adaptation members to be positioned facing each other and no longer in an aligned way as in the case of a purely linear configuration.

Thus, a first mobile adaptation member, such as a short-circuit piston, may be translationally mobile in the first rectilinear segment and a second mobile adaptation member, such as a variable coupling iris, may be translationally mobile in the second rectilinear segment.

As the segments are parallel and facing each other, both mobile adaptation members may be moved in synchronization by simple means, with a single motor and without any complex synchronization device.

According to a feature, the adaptation means include means for driving in translation both mobile members, said driving means being directly coupled with both mobile adaptation members in order to translate them in the wave guide.

Advantageously, the driving means comprise a motor and a coupling part mechanically connecting both mobile adaptation members, said coupling part being translationally displaceable by said motor.

Such driving means are only possible with a curved segment forming a return loop according to the invention, for this it is sufficient to position the coupling part and possibly the motor between both rectilinear segments, without being detrimental to the congestion around the reactor and therefore without bothering an operator who only intervenes on the reactor.

In a particular embodiment, the second rectilinear segment is connected to a third rectilinear segment tilted relatively to said second segment and intended to be connected to said generator, so that the wave guide successively comprises at the output of the generator, the third rectilinear segment, the second rectilinear segment, the curved segment and the first rectilinear segment.

In order to improve the compactness of the transmission device and therefore of the device, it is advantageous that the second and third rectilinear segments extend in a first plane, and that the curved segment and the first rectilinear segment extend in a second plane tilted relatively to said first plane by a non-zero angle, notably an angle of substantially 90°.

Thus, the transmission device has balanced dimensions in width, length and height and no longer mainly in a single direction, thereby allowing a gain in compactness and adaptation of the dimensions to the constraints of the space in which said device will be implanted.

According to other advantageous features of the invention:
  both mobile adaptation members are positioned on the side of the separation wall opposite to said reactor, the first and second rectilinear segments at least partly extending on this side of the separation wall;
  the means for driving into translation both mobile adaptation members are positioned on the side of the separation wall opposite to said reactor.

According to a particular embodiment, the device comprises a compartment inside which said generator is at least positioned, said compartment including said separation wall.

According to a feature, the compartment is inertized by filling it with a neutral gas such as for example argon, carbon dioxide or nitrogen and then sealably insulated in order to avoid leaks of neutral gas. By inertization is meant the technique which comprises replacing an atmosphere, for example an explosive atmosphere, with an incombustible and non-oxidizing gas or gas mixture.

This inertization technique may also be used for putting all or part of the wave guide and/or the coupling means and/or the reactor under an atmosphere in the case of the treatment of a reactive medium comprising flammable, explosive substances, or capable of producing such substances during treatment. For the inertization of the wave guide, windows may be positioned in the wave guide; said windows composed of an insulating material transparent to the waves, such as for example quartz.

According to another feature, the compartment comprises shielding, notably on the separation wall, designed for protecting persons and/or instruments external to said compartment against any risk of explosion and/or fire occurring inside said compartment.

In a particular embodiment, the device comprises at least means for monitoring and/or controlling all or part of the components of said device.

The monitoring and/or control means may be adapted for monitoring and/or controlling the coupling means.

Thus, the treatment device appears as a box from which the portion of the wave guide intended to receive the reactor juts out, in this case the curved segment, so that a user may easily and safely work on the reactor without being bothered by the generator, without inadvertently acting on the generator, or quite simply without seeing the generator. Thus, the user only distinguishes from the device, in addition to the portion of the wave guide which juts out from the compartment, this compartment and the means (as a screen or a table) for monitoring and/or controlling the components of the treatment device which are in majority positioned inside the compartment.

Such an aspect of the invention is particularly advantageous, since the manufacturer of the device may deliver to a laboratory one or more devices in the form of a modular and compact compartment, which may be aligned one after the other, without having to transport the elements separately for then mounting them in the laboratory. With such a design of the heating device it is thus possible during its installation in a laboratory to do away with certain complex steps.

Further, and as described above, a user may simply control the adaptation of the electromagnetic radiation by controlling the synchronous displacement of the mobile adaptation members; said mobile adaptation members being positioned inside the compartment with their driving means so that the user neither observes their operations nor risks interfering with them.

BRIEF DESCRIPTION OF THE DRAWINGS

Other features and advantages of the present invention will become apparent upon reading the detailed description hereafter of a non-limiting exemplary embodiment, made with reference to the appended figures wherein.

DETAILED DESCRIPTION

Figure 1:
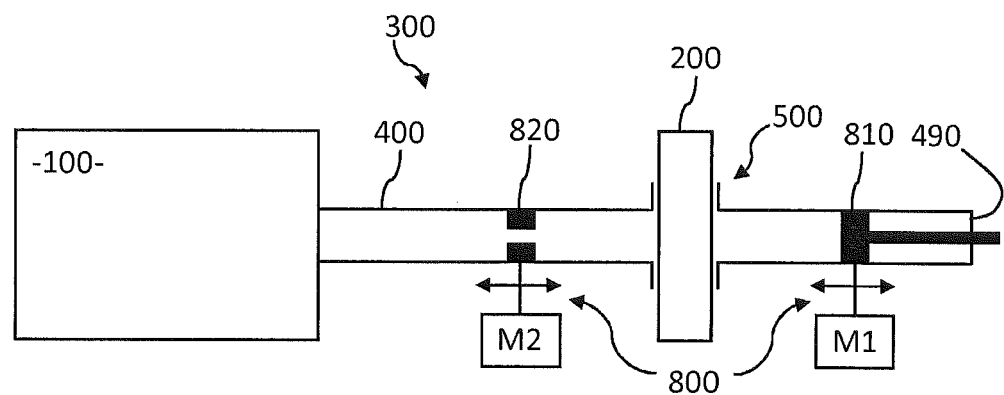
FIG. 1 is a schematic front view of an electromagnetic radiation treatment device of a known type.

A device for treating a reactive medium with electromagnetic radiation according to the invention comprises:
- an electromagnetic wave or radiation generator 1, advantageously a microwave generator;
- a reactor 2 containing said reactive medium; and
- a device 3 for transmitting the electromagnetic radiation generated by the generator to the reactive medium contained in said reactor 2.

The transmission device 3 comprises:
- a wave guide 4 positioned at the output of the generator 1 and coupled with said reactor 2 in order to transmit the electromagnetic energy to the reactive medium;
- coupling means 5 arranged for allowing transfer into the reactive medium of the electromagnetic energy generated and transmitted by the wave guide 4; and
- adaptation means 8 designed for ensuring adaptation of the electromagnetic energy to the reactive medium and allowing optimization of the energy transfer according to the medium.

The adaptation means 8 comprise:
- a first mobile adaptation member 81 composed of a short-circuit piston comprising a metal plate in copper or aluminium for example, placed perpendicularly to the direction of propagation of the waves, said short-circuit piston 81 being positioned at the free end 49 of the wave guide 4 opposite to the generator 1, and therefore downstream from the reactor 2;
- a second mobile adaptation member 82 composed of a variable coupled iris, positioned in the wave guide 4 between the generator 1 and the short-circuit piston 81 and more particularly upstream from the reactor 2.

The reactor 2 generally contains a reactive mixture which is heated by dielectric losses, notably with the purpose of producing chemical of physico-chemical reactions of products in order to carry out analyses, syntheses, extractions, etc. Further, the length of the reactor 2 with a generally tubular shape is adjusted depending on the energy to be transmitted and on the dielectric properties of the product, this in order to limit the dielectric field to a value of less than the breakdown voltage. This reactor 2 may be provided with thermal insulation in order to limit thermal losses. This chemical reactor may also be provided with one or more inlets 20 and outlets 21 allowing different reagents and/or products to be injected and different fractions of the reaction medium to be sampled. The reactor 2 may also comprise a cooling system by circulation of a liquid coolant in order to control the temperature of the reactive medium.

Figure 5:
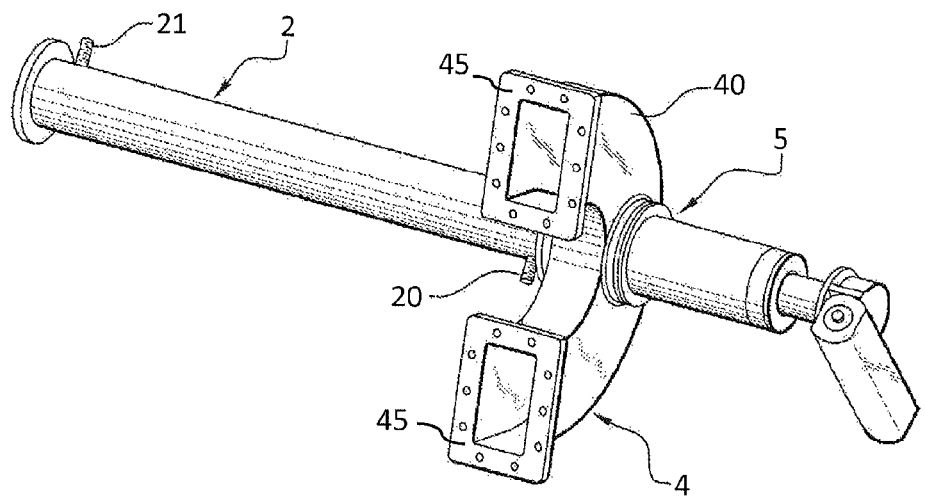
FIG. 5 is a perspective view of a curved segment of a wave guide of the device of FIG. 4, said segment being coupled with a reactor.

The reactor 2 extends along a direction perpendicular or else parallel to the direction of propagation of the waves. In the embodiment illustrated in FIGS. 2, 3 and 5, the reactor 2 extends transversely relatively to the wave guide 4, so as to be perpendicular to the direction of propagation of the waves.

The wave guide 4, for example with a rectangular cross-section, comprises a succession of segments with the same cross-section between its free end 49 and its end 46 connected to the generator 1, in this case
- a first rectilinear segment 41 in which the short-circuit piston 81 is movably mounted;
- a curved segment 40 on which the reactor 2 is coupled, said curved segment 40 having a general "U" shape and forming a 180° return loop from the wave guide 4;
- a second rectilinear segment 42 in which the variable coupling iris is mounted 82; and finally
- a third rectilinear segment 43 at right angles relatively to the second rectilinear segment 42 and coupled with the output of the generator 1, and on which an isolator 11 may be mounted, intended to protect the generator 1 from return of waves.

It is noted that the reactor 2, and therefore the coupling means 5, are positioned at the same distance from the variable coupling iris 82 and from the short-circuit piston 81, for reasons of symmetry. Thus, the reactor 2 is coupled with the top of the "U-shaped" curved segment 40 and both mobile adaptation members 81, 82 are at the same distance from this top. In this configuration, the short-circuit piston 81 and the coupling iris 82 are positioned relatively to the reactor 2 in order to allow centering of the stationary wave on the reactor 2, i.e. the positioning of an antinode of the stationary wave, corresponding to maximum amplitude at the reactor 2.

The waves are successively guided at the output of the generator 1, along the direction Z in the third rectilinear segment 43, along the direction X in the second rectilinear segment 42 and finally along the direction X in the first rectilinear segment, but in a direction opposite to the propagation direction in the second rectilinear segment 42 after passing in the curved segment 40 exactly forming the wave return loop.

According to a particular embodiment of the invention and for reasons of ease of manufacture, these segments 40-43 are distinct parts which are attached firmly together, one after the other. In order to secure the segments 40-43 together, provision is made in this embodiment for providing each of them with a flange 45; these flanges 45 being for example intended to be bolted to each other. Further, for ensuring the connection between the second 42 and the third 43 rectilinear segments, provision is made for interposing between both of these segments 42, 43 a curved segment 430 at right angles, advantageously with the shape of a circular arc.

Figure 3:
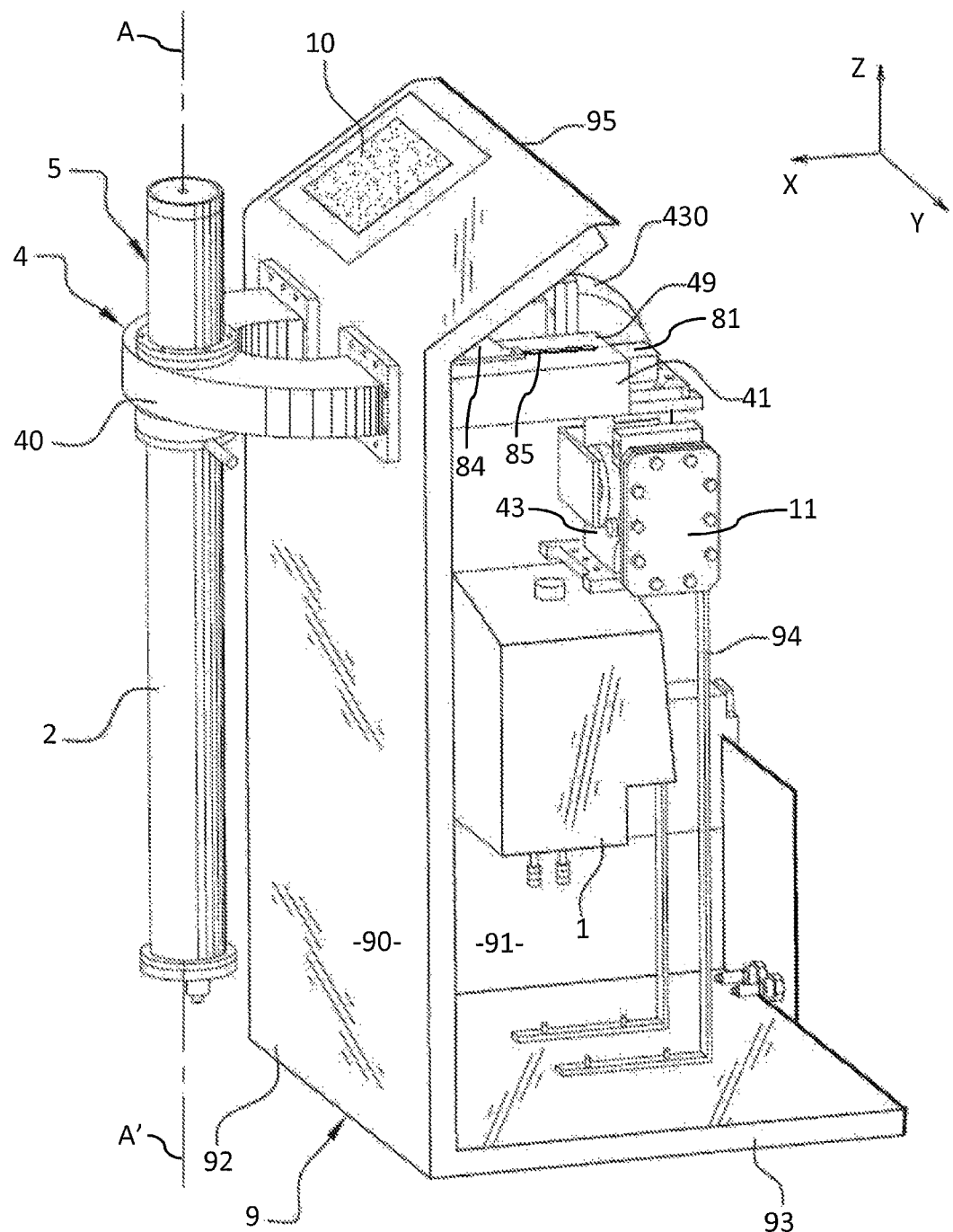
FIG. 3 is a perspective view of an electromagnetic radiation treatment device according to the invention.
Figure 4:
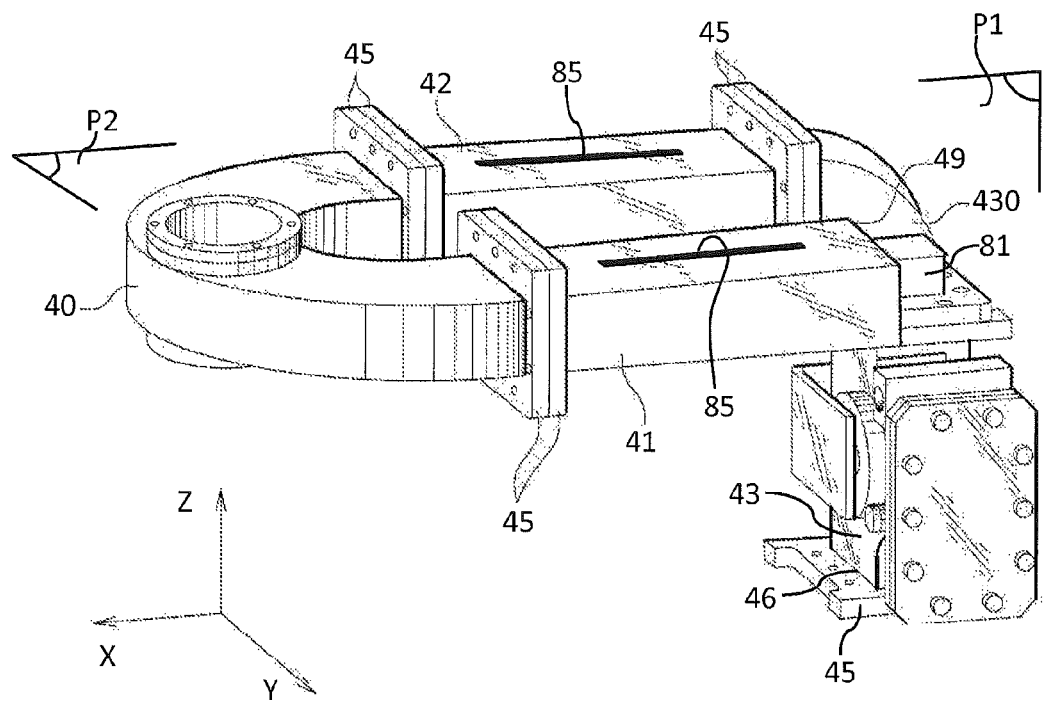
FIG. 4 is a perspective view of a transmission device according to the invention fitting out the device of FIG. 2.

As illustrated in FIG. 4, the second rectilinear segment 42 and the third rectilinear segment 43 extend in a first plane P1, parallel to the (XZ) plane of the reference system (XYZ) illustrated in FIGS. 3 and 4. Further, the curved segment 40 and the first rectilinear segment 41 extend in a second plane P2 parallel to the plane (XY) and therefore perpendicular to said first plane P1. It is also noted that the curved segment 40, the first rectilinear segment 41 and the second rectilinear segment 42 all three extend in the same plane P2.

Thus, as illustrated in FIG. 3, the reactor 2 extends along a main direction AA' parallel to the axis Z and therefore perpendicular to the plane P2, so that the reactor 2 does not extend between the first rectilinear segment 41 and the second rectilinear segment 42.

Figure 2:
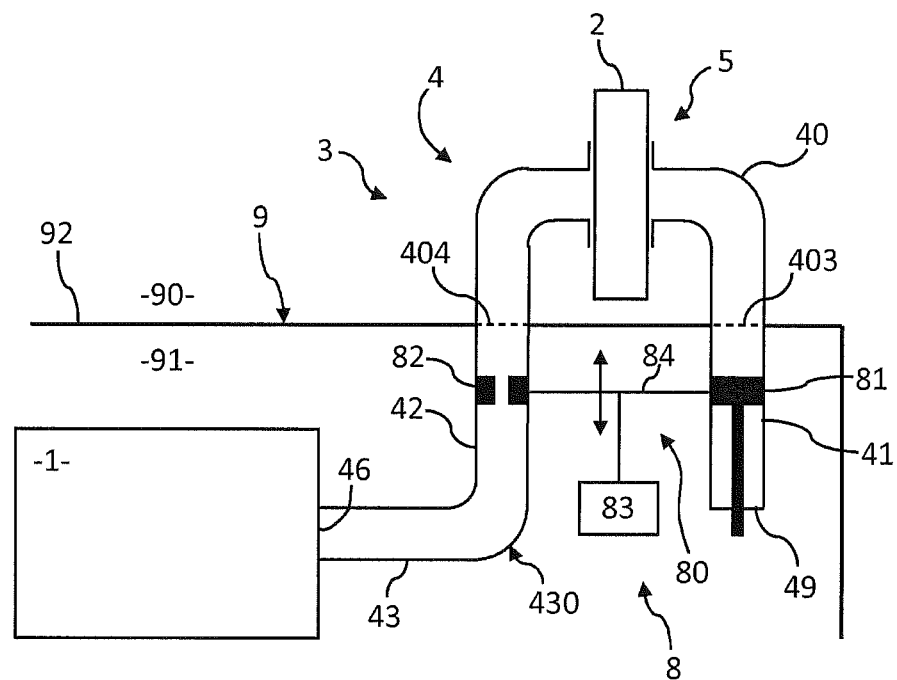
FIG. 2 is a schematic front view of an electromagnetic radiation treatment device according to the invention.

As illustrated in FIG. 2, schematically, the adaptation means 8 include means 80 for driving in translation the short-circuit piston 81 and the variable coupling iris 82, said driving means 80 being directly coupled with both of these mobile adaptation members 81, 82 in order to translate them in the wave guide 4. Direct coupling between the short-circuit piston 81 and the variable coupling iris 82 is achieved by means of a coupling part 84 mechanically connecting both of these mobile members 81, 82, this coupling part 84 being displaceable translationally by a motor 83 to which it is directly connected.

Figure 6:
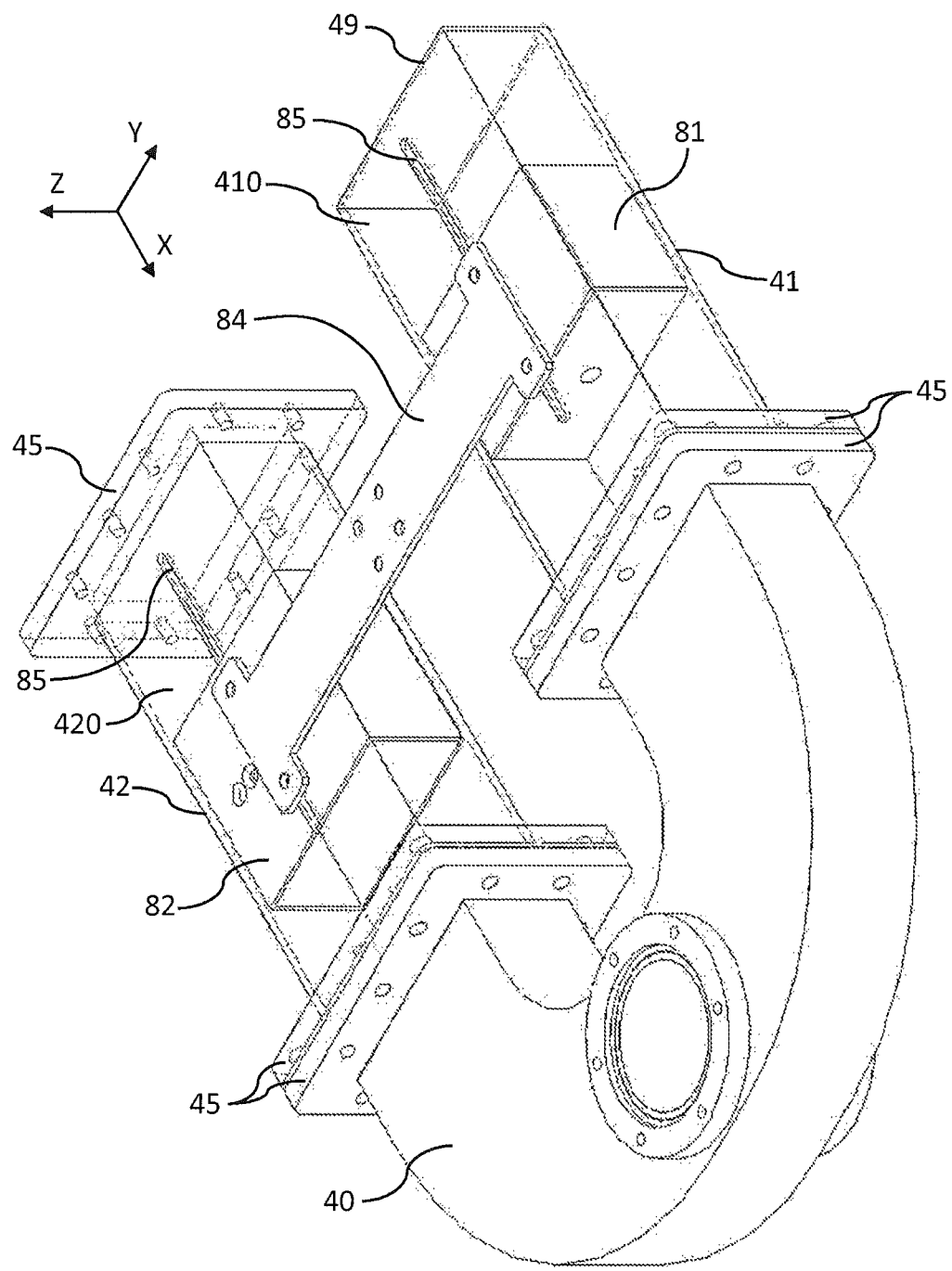
FIG. 6 is a perspective view of the transmission device of FIG. 4 illustrating the curved segment and the two rectilinear segments inside each of which a mobile adaptation member is movably mounted, said rectilinear segments being illustrated with transparent walls in order to show said mobile adaptation members.

As illustrated in FIG. 6, the coupling part 84 comprises a flat elongated part with a small thickness, having two opposite ends, 841 and 842 respectively, each bearing against a wall 410, 420 of the first 41 and second 42 rectilinear segments respectively.

The first end 841 of the coupling part 84 is attached onto the short-circuit piston 81 by non-illustrated attachment means, such as for example of the screw/bolt assembly type or rivets, which cross a slot 85 made for this purpose in said wall 410 of the first rectilinear segment 41. This slot 85 with an oblong shape extends parallel to the X direction corresponding to the direction of propagation of the waves in this first rectilinear segment 41.

The second end 842 of the coupling part 84 is attached onto the variable coupling iris 82 by other attachment means which cross a slot 85 made for this purpose in said wall 420 of the second rectilinear segment 42. This slot 85, also with an oblong shape, extends parallel to the X direction corresponding to the direction of propagation of the waves in this second rectilinear segment 41. The slot 85 is of a predetermined length in order to limit displacement of the mobile adaptation members 81, 82 between two bounds corresponding to the ends of the slots 85.

The coupling part 84 comprises a central portion 840, between both ends 841, 842, which is directly connected to a single motor 83 which moves said part 84 in translation along the X direction.

As illustrated in FIG. 3, the treatment device according to the invention may comprise a compartment 9 with a separation wall 92 which separates the generator 1 from the reactor 2; this wall 92 extends in a plane (YZ) perpendicular to both aforementioned planes P1 and P2.

The wave guide 4 crosses the separation wall 92 twice so that
the curved segment 40 is positioned on the side 90 of the reactor 2, i.e. on the outside of the compartment 9; and
the rectilinear segments 41, 42, 43 are located on the side 91 of the generator 1, i.e. inside the compartment 9.

The junction between the curved segment 40 and the rectilinear segments 41 and 42 is effected at the separation wall 92, the corresponding flanges 45 being substantially located in the plane of this wall 92. Thus, the ends 403 and 404 respectively of the curved segment 40, at which the first 41 and the second 42 rectilinear segments are respectively connected, are located in the plane of the wall 92.

With reference to FIG. 3, the compartment 9 includes a base 93 laid on the ground and the separation wall 92 forms a sidewall of said compartment 9 interposed between the reactor 2 and the generator 1. The reactor 2 with a tubular shape along the vertical direction Z, at least partly extends beside the generator 1. Such an arrangement notably allowed by the adapted shape of the wave guide 4, provides reduced congestion on the ground since the generator 1 and the reactor 2 are positioned side by side.

Further, the compartment 9 may include rails 94 attached on the base 93 and intended for maintaining part of the components of the device, raised, such as the generator 1.

The compartment 9 includes an upper wall 95 on which are positioned means 10 for monitoring and/or controlling all or part of the components of the treatment device, such as the generator 1, the adaptation means 8 and more particularly its driving means 8 such as the motor 83, and the coupling means 5. These monitoring and/or controlling means 10 may for example assume the shape of a monitoring and control screen.

The compartment 9 may also include other sidewalls, not shown, so as to seal the compartment with regard to the outside. The compartment 9 may thus be inertized by filling it with a neutral gas, such as for example argon, carbon dioxide or nitrogen, and sealably insulated. Further, a portion of the wave guide 4 may also be inertized by filling it with a neutral gas, insulation windows (not shown) may be placed inside the wave guide 4, for example at each of the ends 403 and 404 of the curved segment 40; said windows composed of an insulating material and transparent to the waves, such as for example quartz.

Further, the compartment 9 may be provided with additional shielding, in particular on its separation wall 92, in order to protect external persons and instruments against any risk of explosion of the generator and/or of fire towards a fire occurring inside said compartment 9. Such shielding will be particularly suitable for avoiding that sparks occurring at the generator risk being transmitted to the reactor 2 and to the products which it may contain.

With a device according to the invention, a user of the device more particularly interested by the reactor 2 than by the system for generating and transmitting electromagnetic energy, such as for example a chemistry analyst, only has in front of him a (at least partly) closed compartment 5 from which the reactor 2 juts out and the monitoring and control screen 10. The analysis operations are therefore facilitated for this user, who does not have to take any particular precautions or only a few, with the chemicals, and who may more easily replace or work on the reactor 2 without any risk of damaging the line for generating and transmitting electromagnetic energy.

It is noted that the treatment device according to the invention has optimized and balanced congestion in the longitudinal X, transverse Y and vertical Z directions. The longitudidimension of the device is thus reduced as compared with those which are mainly positioned in line.

As regards the coupling means 5, they comprise an application device 7 for applying energy to the reactive medium, currently called an energy applicator, the selection of which depends on the radiation used (high frequencies and microwaves), on dimensional characteristics of the medium to be treated and on its treatment method.

Figure 7:
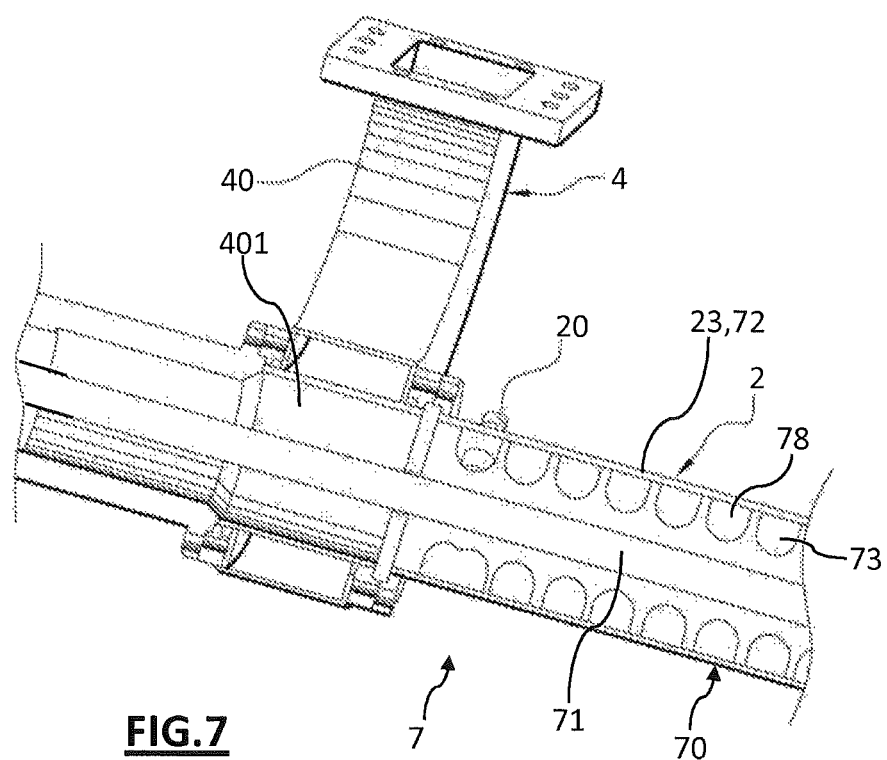
FIG. 7 is a partial longitudinal sectional view of a reactor and of a wave guide, more particularly illustrating the coupling between an application device and the wave guide.

As illustrated in FIG. 7, the application device 7 comprises an applicator 70 of the near field type which at least partly extends into the interior of the reactor 2, the reactor 2 thereby forming a resonant cavity inside which the electromagnetic radiation is introduced by the near field applicator 70.

This near field applicator is at least made as a lossy transmission line 70 having an interface for transferring the electromagnetic energy to the reactive medium. French patent application No. FR 08/01541 describes a lossy transmission line of this type and reference may helpfully be made to it for more details relating to the lossy transmission line.

The lossy transmission line 70 comprises at least one first 71 and one second 72 electric conductors at least partly insulated from each other by means of an insulator 73 having suitable dielectric characteristics, the first conductor 71 being intended to be coupled to the generator 1 on the one hand and to the reactive medium on the other hand in order to allow application of the generated electromagnetic energy to said reactive medium. The second conductor 72 here forms an external wall 23 of the reactor 2 inside which said reactive medium is positioned, which may for example circulate in a circulation channel 78 delimited by a groove made in a hollow body in a wave-transparent material, and the dielectric insulator 73 at least partly comprises the reactive medium.

The lossy transmission line 70 is coupled with the wave guide 4. For this, the wave guide 4 includes a coupling segment which here is the curved segment 40; said coupling curved segment 40 extending normally to the lossy transmission line 70. The curved segment 40 of the wave guide 4 interiorly delimits a coupling cavity 401 into the interior of which the first conductor 71 of the lossy transmission line 70 extends; said first conductor 71 being stripped in said coupling cavity 401, i.e. without being surrounded by an insulator. Thus, the first conductor 71 is coupled with the waved guide 4 at this coupling cavity 401 in which said first conductor 71 receives the electromagnetic radiation conveyed by the wave guide 4.

Of course, the exemplary embodiment mentioned above does not have any limiting character and other details and improvements may be made to the device according to the invention, without however departing from the scope of the invention, wherein other wave guide forms may be made.

For example, the curved segment may assume the shape of a rectilinear central segment on which the reactor is coupled, which is provided at each of its ends with a curved segment at right angles, advantageously with the shape of a circular arc, like the curved segment at right angles 730 described above. Both curved segments at right angles are oriented along the same direction and in the same sense in order that that the curved segment, formed by the association of the rectilinear segment and of both segments curved at right angles, has a general "U" shape.

The invention claimed is:

1. A device for treating a reactive medium with electromagnetic radiation comprising an electromagnetic radiation generator, a reactor containing said reactive medium, and a device for transmitting the electromagnetic radiation generated by the generator to the reactive medium contained in said reactor, said device comprising a wave guide intended for transmitting the electromagnetic radiation of the generator and coupling means arranged so as to allow transfer into the reactive medium of the electromagnetic energy transmitted by the wave guide, wherein the wave guide includes:
    a curved segment, in a general "U" shape, forming a return loop from said wave guide, and
    first and second rectilinear segments facing each other and respectively connected to first and second ends of said curved segment, said rectilinear segments being substantially parallel or tilted relatively to each other,
    and further comprising a separation wall allowing isolation of the generator from the reactor, said reactor being coupled with the curved segment of the wave guide and said curved segment extending on one side of the separation wall opposite to said generator, and
    wherein the wave guide crosses the separation wall twice wherein:
        the curved segment is positioned on a first side of the separation wall, and
        the rectilinear segments are located on a second side of the separation wall.

2. The device according to claim 1, wherein the coupling means comprise an application device for applying the energy to the reactive medium.

3. The device according to claim 2, wherein the application device is an applicator of a near field type which at least partly extends into the interior of the reactor, said reactor forming a resonant cavity inside which the electromagnetic radiation is introduced by the applicator.

4. The device according to claim 3, wherein the applicator comprises at least one lossy transmission line having an interface for transfer of the electromagnetic energy towards the reactive medium.

5. The device according to claim 1, further comprising adaptation means designed for ensuring adaptation of the electromagnetic radiation to said reactive medium, said adaptation means comprising two mobile adaptation members positioned in the wave guide on either side of said curved segment.

6. The device according to claim 5, wherein a first mobile adaptation member is translationally mobile in the first rectilinear segment, and a second mobile adaptation member is translationally mobile in the second rectilinear segment.

7. The device according to claim 6, wherein adaptation means include driving means for driving into translation both mobile adaptation members, said driving means being directly coupled with both mobile adaptation members in order to translate them in the wave guide.

8. The device according to claim 1, wherein the second rectilinear segment is connected to a third rectilinear segment tilted relatively to said second segment and connected to said generator, so that the wave guide successively comprises, at the output of the generator, the third rectilinear segment, the second rectilinear segment, the curved segment and the first rectilinear segment.

9. The device according to claim 8, wherein the second and the third rectilinear segments extend in a first plane, and in that the curved segment and the first rectilinear part extend in a second plane tilted relatively to said first plane by a non-zero angle.

10. The device according to claim 5, wherein both mobile adaptation members are positioned on one side of the separation wall opposite to said reactor, the first and the second rectilinear segments at least partly extending on this side of the separation wall.

11. The device according to claim 7, wherein the means for driving into translation both mobile adaptation members are positioned on the side of the separation wall opposite to said reactor.

12. The device according to claim 1, further comprising a compartment inside which said generator is at least positioned, said compartment including said separation wall.

13. The device according to claim 12, wherein the compartment is inertized by filling it with a neutral gas comprising argon, carbon dioxide or nitrogen.

14. The device according to claim 12, wherein the compartment comprises shielding, notably on the separation wall, designed for protecting persons and/or instruments external to said compartment against any risk of explosion and/or fire occurring inside said compartment.

15. The device according to claim 7, wherein the driving means comprise a motor and a coupling part mechanically connecting both mobile adaptation members, said coupling part being translationally displaceable by said motor.

* * * * *